Figure 1:
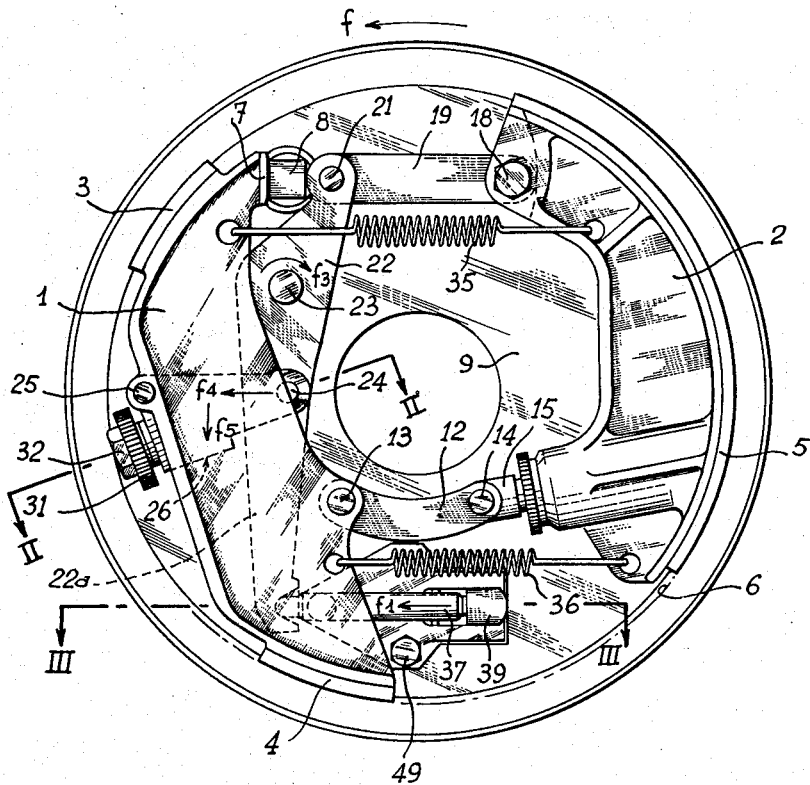

May 18, 1965  L. C. BRISSON  3,184,010
LEVER ACTUATED BRAKE

Filed March 18, 1963  2 Sheets-Sheet 1

May 18, 1965

L. C. BRISSON 3,184,010

LEVER ACTUATED BRAKE

Filed March 13, 1963

2 Sheets-Sheet 2 ně# United States Patent Office 3,184,010
Patented May 18, 1965

3,184,010
LEVER ACTUATED BRAKE
Louis Charles Brisson, Vineuil Saint-Firmin, France
(Jagny sous Bois, par Mareil-en-France, Seine et Oise, France)
Filed Mar. 18, 1963, Ser. No. 265,907
Claims priority, application France, Mar. 23, 1962, 891,968
6 Claims. (Cl. 188—78)

The present invention relates to brakes, notably for road vehicles, of the type comprising a primary and a secondary shoe interconnected by a coupling member and mounted on a plate fixed coaxially with respect to the brake-drum, the primary shoe receiving the effort necessary for expanding the two shoes whilst the trailing extremity of the secondary shoe is supported by an element pivotally attached to the said plate the secondary shoe reacting on this element which also operates to move the primary shoe. In the foregoing and in what follows, the terms leading and trailing will be understood to be considered in relation to the sense of the usual displacement of the drum relative to the shoes.

Attempts have already been made to produce a brake of this sort which, in particular, on the one hand is powerful, i.e. is capable of applying the shoes to the drum with great force, the related input effort being relatively low, and on the other hand is stable, i.e. the variations in braking torque are very small compared with the variations in the coefficient of friction of the brake linings which latter particularly result from temperature increases.

To this end, solutions have already been proposed making exclusive use of hydraulic means, however, the drawback here is that the installations are relatively costly.

Again, mechanical solutions have been put forward, comprising systems of levers combined with the brake-applying element and located between the two ends of the shoes remote from those interconnected by the coupling member. Solutions on these lines have not proven entirely satisfactory. This is because the available space in this region of the braking installation is limited and the length of the levers in the mechanical linkages which it is desired to house there are short such that their operating conditions are quite restricted and, moreover, vary with the brake operating conditions such as lining wear, variations in the coefficient of friction of the lining, temperature, etc.

The aim of the invention is to produce a brake of the type outlined in the first paragraph of this description, which does not exhibit the foregoing drawbacks and which, compared with the known installations, has certain advantages which will become more apparent in the following.

According to the present invention a brake has a back-plate and primary and secondary brake shoes and includes an operating lever which is pivoted at an intermediate point to the back-plate and one end of which is articulated to the trailing end of the secondary shoe and the other end of which is articulated to the primary shoe at a point or points displaced from the ends of the shoe.

It is found desirable to form the connection to the primary shoe as near as possible to the mid-point of the shoe's length.

Conveniently the operating lever is formed with an extension which is connected to a movable brake-operating element.

Preferably the shoes are interconnected by a coupling member which is substantially parallel to the element connected to the primary shoe, both the said coupling member and the said element being substantially perpendicular to the length of the operating lever.

Preferably also the operative dimension of the connecting element is adjustable.

It is found convenient to provide a stop in the form of a boss which is provided on the back-plate and is located between the leading end of the primary shoe and that the end of the operating lever which is articulated to the secondary shoe.

In an alternative construction the primary shoe is articulated to the operating lever by means of a T-shaped component, the leg of which is pivotally connected to the operating lever and each of the two ends of its cross-piece being articulated respectively to the end of one of a pair of two thrust members the other ends of which are pivotlly connected to the primary shoe.

It is thus possible to create an efficient mechanical system having levers of substantial length such that the kinematics of the system can be optimally designed and such that the conditions of operation hardly vary at all when the brake operating conditions are modified. Considering then, that the effort is applied to the primary shoe effectively at the mid-point of its length and more or less radially, the displacement of this shoe, once its starts to be forced against the brake drum, takes place in the direction essentially perpendicular to the direction of the original effort; this means that besides the travel of the operating lever, this primary shoe has a further, uncalled for degree of travel. In other words, the effect is that the primary shoe has an apparently larger travel than the actual degree of travel imparted to it by the operating lever. This means that a brake is obtained which is both powerful and stable in accordance with a compromise much superior to those reached with the known systems, bearing in mind that these two qualities of power and stability are always in opposition.

Figure 2:
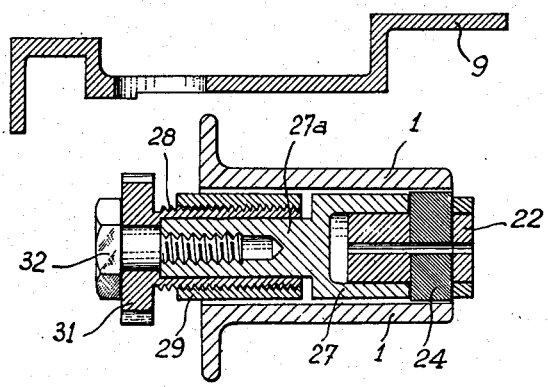
Figure 4:
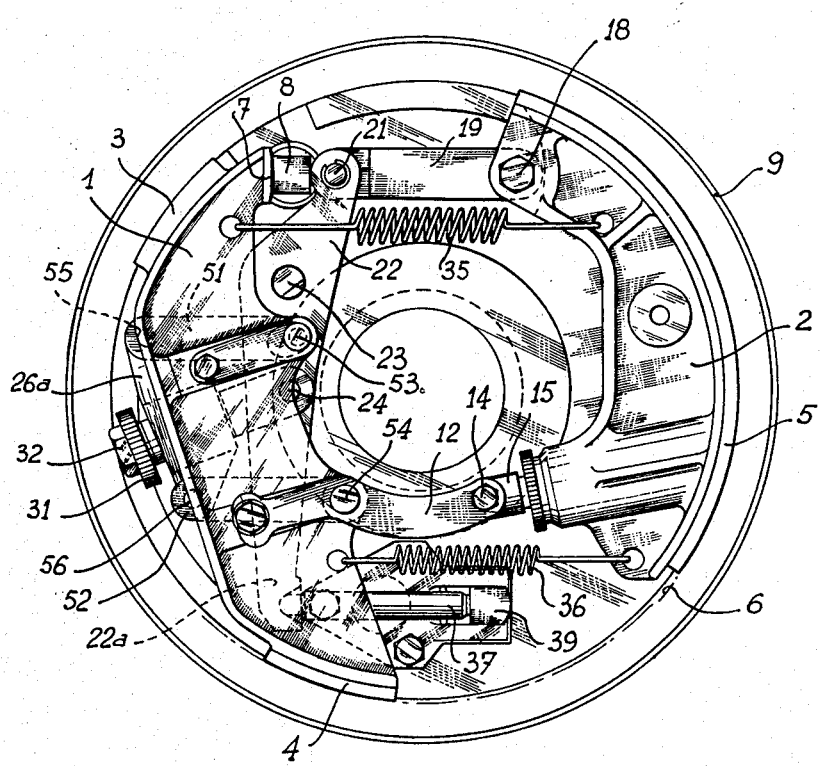
Figure 3:
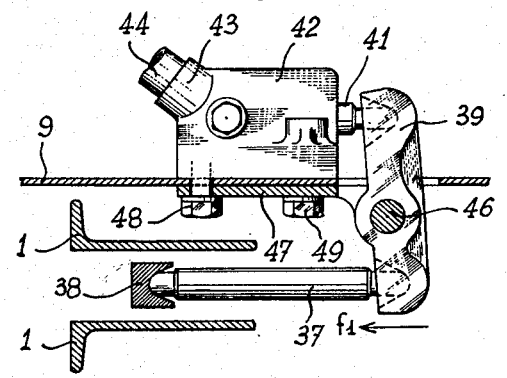

Two embodiments of the invention are shown, merely by way of example in the accompanying drawings in which, FIGURE 1 schematically illustrates, in front elevation, one embodiment of the brake to which the invention relates;

FIGURE 2 and FIGURE 3 are part-sections taken on the lines II—II and III—III respectively, in FIGURE 1, and, FIGURE 4 is a front elevational view of another form of the brake of FIGURE 1.

The brake illustrated in FIGURES 1 to 3, comprises a primary shoe 1 and a secondary shoe 2, the former's discontinuous lining (3 and 4) and the latter's continuous lining 5 being intended for application against the interior cylindrical surface of a brake drum represented simply by the broken line 6.

This could, for example, be a brake for the wheel of a car, which wheel, when the car is moving forward, rotates in the direction indicated by the arrow $f$. The leading end of the primary shoe 1, considered in relation to the sense of displacement $f$ of the drum, carries a facing 7 which, when the shoe is at rest, abuts one of the faces of a boss 8 integral with the plate 9 on which the brake assembly is mounted.

The primary shoe 1 is connected via a coupling member 12 to the secondary shoe 2. The coupling member 12 is in direct pivotal connection with the primary shoe, by means of a pin 13, whilst its other end is likewise connected, by means of a pin 14, to a component 15 housed in the shoe 2 in adjustable fashion, this component being of any convenient and conventional type serving to compensate for wear of the lining 5.

The trailing end of the secondary shoe 2 is connected in articulating fashion, by means of a pin 18, to one end of a connecting member 19, the other end of which is likewise connected, by means of a pin 21, to one arm of a brake-operating lever 22 which is pivoted at some intermediate point in its length on a pin 23 carried by a fixed plate 9.

The operating lever 22 is also connected to the primary shoe 1 at some intermediate point in the latter's length located as near as possible to the mid-point, by means of a thrust member of adjustable length comprising an assembly of several parts and designated in its entirety by 26. One end of this member is connected in articulating fashion, by means of the pin 24, to the lever 22 and the other end, by means of a pin 25, to the shoe 1.

The thrust member 26 is constituted by a fork 27 through whose two arms the pivot pin 24 is passed and which is provided with a cylindrical extension 27a carrying an adjusting bush 28 which can turn freely on it. The external surface of the bush 28 is likewise cylindrical; it is threaded and engages in a corresponding tapped hole in a component 29 through which the pivot pin 25 passes.

The bush 28 has a knurled flange 31 by means of which it can be turned about its axis, and is held on the component 27, together with the component 29, by means of a setscrew 32 for example.

By means of the knurled flange 31, the bush 28 can be rotated and displaced axially with respect to the component 27, i.e. the primary shoe assembly 1 can be displaced relative to the operating lever 22 so as to take up any wear at its linings 3 and 4.

The member 26 has each of its pivot pins 24, 25 located essentially on the same radius of the brake, the pivot pin 25 being more or less at the mid-point in the length of primary shoe 1. Moreover, the coupling member 12 and the thrust member 19 of the secondary shoe, are essentially parallel with this direction.

The return of the two shoes to their rest position is effected by two return springs 35, 36, the ends of which are hooked through corresponding holes in the shoes concerned.

Brake application is effected by the action of an operating element on an extension 22a of the lever 22, beyond the point at which the thrust pivot 24 for the primary shoe is situated. In this exemplary embodiment, this element is constituted by a thrust rod 37 located more or less diametrically opposite the connecting member 19 for the secondary shoe, one of its ends resting in a cup 38 formed integrally with the end of the extension 22a of the operating lever and the other of its ends resting on the base of a cup situated at one of the ends of a rocker 39. The other end of this rocker likewise possesses a cup on the base of which rests the piston 41 of a hydraulic cylinder 42 provided with a connection 43 for a pipe 44 leading to the master-cylinder which controls the braking of the vehicle (FIGURE 3).

The rocker 39 is pivoted on a pin 46 formed integrally with a mounting 47 which simultaneously serves as a reinforcement and which is clamped to the plate 9 by means of the common screws 48, 49 also holding the cylinder body 42 on the other face of the plate.

The operation of the brake is as follows:

Starting from the rest position, in which all the components of the system are in the position illustrated in the drawing, when pressure is applied to the brake pedal the piston 41 in the hydraulic cylinder 42 causes the rocker 39 to pivot so that the thrust rod 37 is forced in the direction indicated by the arrow f1, thus causing the operating lever 22 to pivot in the sense indicated by the arrow f3. The primary shoe 1, pushed by the member 26 connected to the operating lever, is immediately forced against the wall 6 of the brake drum; as soon as the linings of this shoe come into contact with the drum, it is forced gently in the sense of the arrow f and, by means of the coupling member 12, exerts a thrust on the secondary shoe 2 which is then thrust forcibly against the drum 6, its trailing end being supported, via the member 19, against the other arm of the operating lever 22.

The distance between the operating lever pivot pin 23 and the pins 24 and 21 respectively connected to the primary and secondary shoes, is relatively important if the equilibrium of the lever 22 is not to be susceptible to parasitic friction forces. It will be seen, moreover, that after preliminary displacement of the pivot pin 24 in the direction of the arrow f4, the primary shoe 1 is urged, on contact with the drum, in a direction f5 essentially perpendicular to the direction f4. This additional travel is gained without it being necessary for the pivot pin 24, and consequently the piston of the brake-operating cylinder to travel beyond the extent governed by the degree of depression of the brake pedal.

Additionally, the hydraulic cylinder 42, which in the example under consideration is shown outside the brake installation and is consequently situated in the surrounding airstream, is efficiently cooled; another factor which improves the operating conditions of the brake. In brakes subjected to low loading only, where the degree of heating is small, the hydraulic cylinder could be placed inside the drum.

In the variant form illustrated in FIGURE 4, in which like reference numbers have been retained for like elements, the sole difference resides in the fact that the thrust member for the primary shoe, one end of which member is connected in articulating fashion to the operating lever 22, instead of being connected to the primary shoe by a single pivot pin, is connected to the said shoe by a system comprising two parallel members 51, 52 each being pivotally connected, at 53, 54 respectively, to the primary shoe 1 and at 55, 56 respectively, to the composite thrust member designated by 26a. To this end, the latter takes the form of a T-piece, the end of whose leg is pivotally connected to the pin 24 carried by the operating lever 22 and the two ends of its cross-piece carrying the two pins 55 and 56 respectively.

The geometry is such that the two pins 51 and 52 are essentially parallel with the shoe link pin 12, in the same way that the thrust pin 26 was parallel with this same pin 12 in the embodiment of FIGURE 1.

In this way, a system is created the kinematics of which theoretically approach closer to an optimum that which, on the other hand, is slightly more complicated.

Self-evidently, the invention is not limited to the embodiments described and illustrated, these having solely been put forward by way of example, and it is possible to effect numerous modifications without departing from the principle of the invention.

I claim:

1. In combination with a circular brake drum mounted for rotation with a wheel of a vehicle, a brake system comprising:

(a) a fixed brake plate rigidly connected to an axle of said vehicle;

(b) operating lever means pivotally mounted on said plate at an intermediate point on said lever, said lever means having a length substantially equal to the diameter of said brake drum;

(c) brake actuating means mounted on said plate and bearing against one end of said lever means to cause the latter to pivot under the action of a braking pressure applied to said actuating means;

(d) primary brake shoe means having a braking surface adjacent to, and concentric with, said brake drum;

(e) secondary brake shoe means having a braking surface adjacent to, and concentric with, said brake drum;

(f) first link means pivotally connecting said primary brake shoe to the leading end of said secondary brake shoe, said leading one end being the end of said brake shoe first encountered by a point on said brake drum when said vehicle is traveling forward;

(g) second link means pivotally connecting the other end of said lever to the other end of said secondary shoe; and (h) thrust means pivotally connected between a point on said primary shoe and a point on said lever, said latter point being between said one end thereof and the point where said lever is mounted on said plate (i) whereby, when said lever is pivoted by said actuating means, it urges both brake shoes against said drum and the rotational movement induced in said primary shoe by contact with the rotating drum is translated by said first link means into a force further urging said secondary shoe against said drum.

2. A brake system as recited in claim 1 wherein the line joining said points of connection of said thrust means lies on a radius of the circle described by said brake drum.

3. A brake system as recited in claim 2 wherein said thrust means are connected to said primary shoe in the central region thereof.

4. A brake system as recited in claim 1 wherein said thrust means comprises: a T-piece having a cross-leg and a main leg one end of which is pivotally connected to said lever and the other end of which is rigidly connected to the center of said cross-leg; and a pair of parallel members each of which has one end pivotally connected to a respective end of said cross-leg and the other end pivotally connected to said primary shoe.

5. A brake system as recited in claim 1 wherein said first link means and said thrust means are each substantially perpendicular to said lever means.

6. A brake system as recited in claim 1 further comprising stop means rigidly mounted on said brake plate between said other end of said lever and one end of said primary shoe for limiting the movement of said two last-named elements.

References Cited by the Examiner
UNITED STATES PATENTS
2,280,784  4/42  Berno _____ 188—78

ARTHUR L. LA POINT, *Primary Examiner.*
R. DAVID BLAKESLEE, *Examiner.*